US010421517B2

(12) United States Patent
Coaplen et al.

(10) Patent No.: US 10,421,517 B2
(45) Date of Patent: Sep. 24, 2019

(54) HEADSET WITH DAMPING FEATURES

(71) Applicant: Cane Creek Cycling Components, Inc., Fletcher, NC (US)

(72) Inventors: Joshua Philip Coaplen, Asheville, NC (US); James Gray Morrison, Asheville, NC (US)

(73) Assignee: CANE CREEK CYCLING COMPONENTS, INC., Fletcher, NC (US)

( * ) Notice: Subject to any disclaimer, the term of this patent is extended or adjusted under 35 U.S.C. 154(b) by 99 days.

(21) Appl. No.: 15/556,856

(22) PCT Filed: Mar. 7, 2016

(86) PCT No.: PCT/US2016/021136
§ 371 (c)(1),
(2) Date: Sep. 8, 2017

(87) PCT Pub. No.: WO2016/144853
PCT Pub. Date: Sep. 15, 2016

(65) Prior Publication Data
US 2018/0043960 A1 Feb. 15, 2018

Related U.S. Application Data

(60) Provisional application No. 62/132,201, filed on Mar. 12, 2015.

(51) Int. Cl.
*B62K 21/08* (2006.01)
*B62K 21/06* (2006.01)
*B62K 19/32* (2006.01)
(52) U.S. Cl.
CPC .............. *B62K 21/08* (2013.01); *B62K 19/32* (2013.01); *B62K 21/06* (2013.01)

(58) Field of Classification Search
CPC ......... B62K 21/08; B62K 21/06; B62K 19/32
See application file for complete search history.

(56) References Cited

U.S. PATENT DOCUMENTS 3,785,676 A * 1/1974 Klein, Jr. ................. B62H 5/06
280/279
4,834,412 A * 5/1989 Trema .................... B62K 21/02
280/276
(Continued)

FOREIGN PATENT DOCUMENTS

GB       286520      3/1928
GB       308935   *  4/1929
(Continued)

OTHER PUBLICATIONS

International Search Report dated May 16, 2016.

*Primary Examiner* — Anne Marie M Boehler
(74) *Attorney, Agent, or Firm* — Dority & Manning, P.A.

(57) ABSTRACT

Headsets and head tube assemblies for vehicles are provided. A vehicle includes a steerer tube and a head tube. A headset rotatably connects the steerer tube and the head tube. The headset includes a coupling ring which includes a body and a central bore defined in and extending through the body. The coupling ring is connectable to and rotatable with the steerer tube. The headset further includes a cup which includes a body and a central bore defined in and extending through the body. The cup is connectable to and rotatable with the head tube. The headset further includes a damper assembly, the damper assembly including a first damper element rotatable with the steerer tube and a second damper element rotatable with the head tube, the first damper element and the second damper element in frictional contact with and rotatable relative to each other.

28 Claims, 10 Drawing Sheets

(56) References Cited

U.S. PATENT DOCUMENTS

| | | | | |
|---|---|---|---|---|
| 5,330,220 A * | 7/1994 | Nagano | ............... | B62K 21/06 |
| | | | | 280/279 |
| 6,892,604 B2 * | 5/2005 | Tison | ............... | B62K 21/06 |
| | | | | 280/279 |
| 7,192,044 B2 * | 3/2007 | Ueno | ............... | B62K 21/06 |
| | | | | 280/280 |
| 7,441,961 B2 * | 10/2008 | Li | ............... | B62K 21/06 |
| | | | | 280/279 |
| 7,731,445 B2 * | 6/2010 | Coaplen | ............... | B62K 21/06 |
| | | | | 280/279 |
| 8,262,292 B2 * | 9/2012 | Hsieh | ............... | B62K 21/06 |
| | | | | 280/279 |
| 8,302,981 B1 * | 11/2012 | Ma | ............... | B62K 21/06 |
| | | | | 280/279 |
| 9,051,021 B2 * | 6/2015 | Bettin | ............... | B62K 15/008 |
| 9,242,692 B2 * | 1/2016 | Nago | ............... | B62K 21/12 |
| 9,988,123 B2 * | 6/2018 | Hull | ............... | B62K 21/22 |
| 2004/0007850 A1 * | 1/2004 | Crozet | ............... | B62K 21/06 |
| | | | | 280/280 |
| 2005/0057017 A1 * | 3/2005 | Hara | ............... | B62K 19/32 |
| | | | | 280/279 |
| 2006/0055146 A1 * | 3/2006 | Ueno | ............... | B62K 21/06 |
| | | | | 280/280 |
| 2007/0222177 A1 * | 9/2007 | Chiang | ............... | B62K 21/06 |
| | | | | 280/280 |
| 2008/0159678 A1 * | 7/2008 | Lin | ............... | B62K 21/06 |
| | | | | 384/545 |

FOREIGN PATENT DOCUMENTS

| | | | |
|---|---|---|---|
| JP | H07165148 A | | 6/1995 |
| JP | 200203481 A | | 7/2000 |
| JP | 2000203481 | * | 7/2000 |

* cited by examiner

HEADSET WITH DAMPING FEATURES

FIELD OF THE INVENTION

The present disclosure relates generally to headsets for use with vehicles such as bicycles, tricycles and motorcycles. Specifically, the present disclosure is directed to headsets which include damping features for increasing energy transmissions between the steerer tubes and head tubes of associated vehicles.

BACKGROUND OF THE INVENTION

Headsets are generally utilized in certain types of vehicles to connect and provide a rotatable interface between a steering component and a main frame of the vehicle. For example, in a typical bicycle, an upper headset and a lower headset rotatably connect a steerer tube and a head tube. The head tube is a component of the main frame of the bicycle, and the steerer tube is a component of the bicycle fork. Headsets may be utilized in a wide variety of vehicles, including manual and motor-assisted bicycles, tricycles, motorcycles, mopeds, etc.

One issue with presently known interfaces between the steering component and main frame of such vehicles is insufficient energy transmission between such components. For example, vibrations in/of the steering components during operation of such vehicles can cause rider discomfort and/or a safety concern. It is thus generally desirable to dampen such vibrations, etc., such as by increasing energy transmission between the steering component and the main frame.

Accordingly, improved apparatus for facilitating energy transmission between the steering components and main frames of such vehicles are desired. In particular, headsets which include damping features for increasing such energy transmission would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a headset for a vehicle is provided. The vehicle includes a steerer tube and a head tube. The headset rotatably connects the steerer tube and the head tube. The headset includes a coupling ring which includes a body and a central bore defined in and extending through the body. The coupling ring is connectable to and rotatable with the steerer tube. The headset further includes a cup which includes a body and a central bore defined in and extending through the body. The cup is connectable to and rotatable with the head tube. The headset further includes a bearing assembly disposed within the cup. The bearing assembly includes an inner race, an outer race, and a bearing member disposed between the inner race and the outer race. The headset further includes a damper assembly, the damper assembly including a first damper element rotatable with the steerer tube and a second damper element rotatable with the head tube, the first damper element and the second damper element in frictional communication with and rotatable relative to each other.

In accordance with another embodiment of the present disclosure, a head tube assembly for a vehicle is provided. The vehicle includes a steerer tube, and the head tube assembly is rotatably connectable to the steerer tube. The head tube assembly includes a head tube which includes a body and a central passage defined in and extending through the body along a central longitudinal axis. The body extends between a first end and a second end. The head tube assembly further includes a first headset connected to the first end of the body and a second headset connected to the second end of the body. One of the first headset or the second headset includes a coupling ring which includes a body and a central bore defined in and extending through the body. The coupling ring is connectable to and rotatable with the steerer tube. The one of the first headset or the second headset further includes a cup which includes a body and a central bore defined in and extending through the body. The cup is connectable to and rotatable with the head tube. The one of the first headset or the second headset further includes a bearing assembly disposed within the cup. The bearing assembly includes an inner race, an outer race, and a bearing member disposed between the inner race and the outer race. The one of the first headset or the second headset further includes a damper assembly, the damper assembly including a first damper element rotatable with the steerer tube and a second damper element rotatable with the head tube, the first damper element and the second damper element in frictional communication with and rotatable relative to each other.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
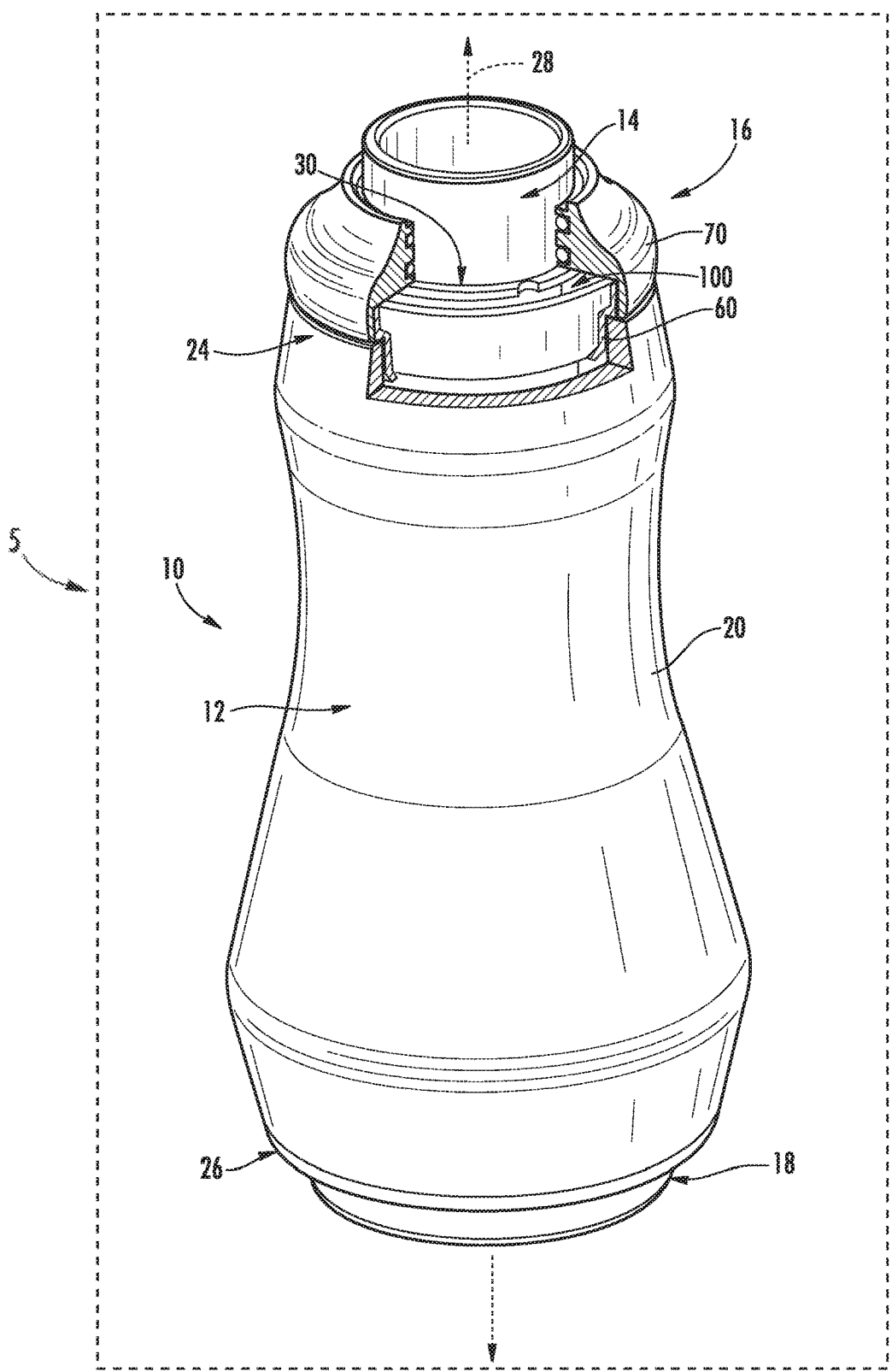
FIG. 1 is a perspective view, with portions cut-away for illustrative purposes, of a head tube assembly in accordance with one embodiment of the present disclosure.
Figure 2:
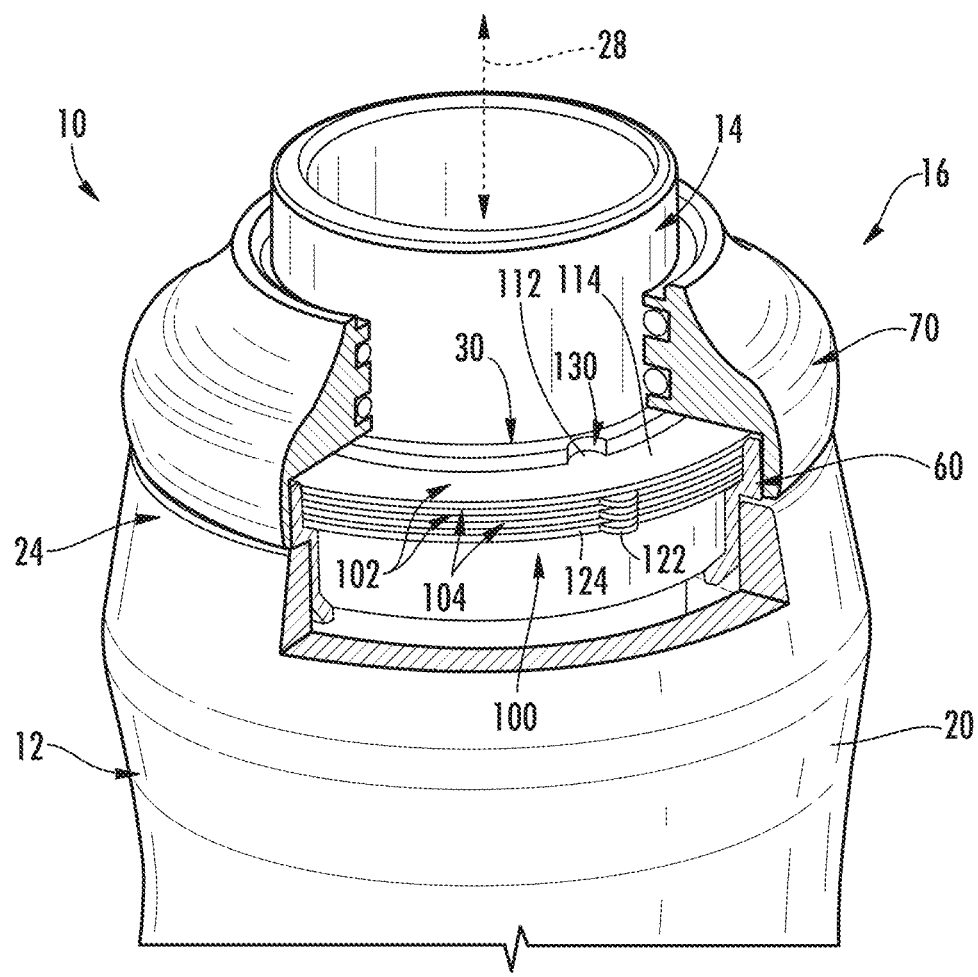
FIG. 2 is a close-up perspective view, with portions cut-away for illustrative purposes, of a portion of the head tube assembly, including an upper headset thereof, of FIG. 1.
Figure 3:
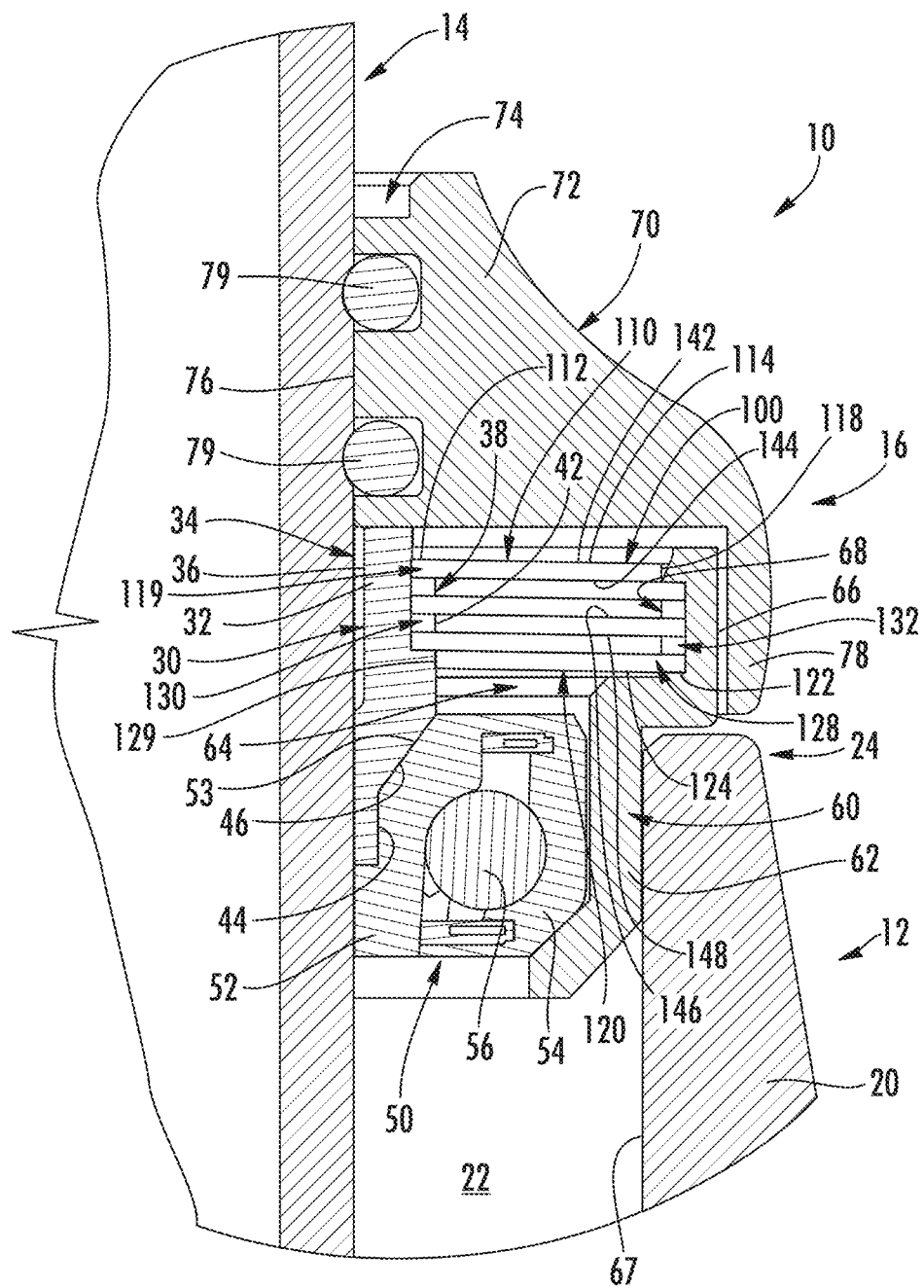
FIG. 3 is a side cross-sectional view of a portion of the head tube assembly, including an upper headset thereof, of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 8, embodiments of a head tube assembly 10 are illustrated. Head tube assembly 10 includes a head tube 12 and one or more headsets, as discussed herein. As is generally understood, the head tube 12 is a component of a main frame (not shown) of a vehicle 5. The head tube 12 may be integral with other components of the main frame, or may be a separate component that is connected to other components of the main frame via welding, suitable mechanical fasteners, etc. In exemplary embodiments, the vehicle 5 is a bicycle, which may be manual or motor-assisted. Alternatively, the vehicle may be a tricycle, motorcycle, moped, or other suitable vehicle. In general, any suitable vehicle which requires a rotatable interface between a steering component and a main frame is within the scope and spirit of the present disclosure.

The vehicle in which head tube assembly 10 may be utilized may further include a steerer tube 14. Steerer tube 14 may be or be part of a steering component of the vehicle. For example, as is generally understood, steerer tube 14 may be a component of a fork for a bicycle. As discussed herein, steerer tube 14 may be rotatable connectable to the head tube assembly 10, thus rotatably connecting the main frame and the steering component of the vehicle.

Head tube 12 includes a body 20 and a central passage 22 defined in and extending through the body 20. The passage 22 may extend through the body 20 between a first end 24 of the body 20 and a second end 26 of the body 20, and may extend along a central longitudinal axis 28 defined by the body 20.

One or more headsets may be connected to the head tube 12 to form the head tube assembly 10. For example, in the embodiments shown, a first headset 16 is connected to the first end 24 of the body 20 and a second headset 18 is connected to the second end 26 of the body 20. The first headset 16 as illustrated can be referred to as an upper headset, while the second headset 18 as illustrated can be referred to as a lower headset. In exemplary embodiments, components of the headsets 16 may be press-fit into the passage 22 at the first and second ends 24, 26 to connect the headsets 16, 18 to the head tube 12.

The steerer tube 14 may generally extend through the central passage 22 and through bores defined in the headsets 16, 18. Further, as discussed herein, steerer tube 14 may be connectable to (and, when assembled, connected) to components of the headsets 16, 18. Rotation of various components of the headsets 16, 18 may facilitate rotation of the steerer tube 14 relative to the head tube 12.

As discussed in detail herein, one or more headsets 16, 18 may include various damping features for damping energy transmission between the steerer tube 14 and the head tube 12. Such damping features are advantageously internal to such headsets, thus providing effective connecting and damping in a single component of a head tube assembly 10 and vehicle thereof. In exemplary embodiments as shown and described herein, the upper headset 16 may include such damping features. It should be understood, however, that the present disclosure is not limited to the use of such damping features in upper headsets 16, and rather that any suitable headsets, including lower headsets 18, may include such features.

As shown in FIGS. 1 through 8, a headset 16 may include a coupling ring 30. Coupling ring 30 may in some embodiments be formed from a pliable material, such as a suitable elastomer, or a non-pliable material, such as aluminum or steel. Alternatively, coupling ring 30 may be formed from any suitable polymer, metal or other suitable material. Coupling ring 30 includes a body 32 and a central bore 34 which is defined in and extends through the body 32. When assembled in a head tube assembly 10, the coupling ring 30 may be generally concentric with head tube 12 with respect to the longitudinal axis 28. Coupling ring 30 may be connectable to and rotatable with the steerer tube 14. For example, steerer tube 14 may extend through the central bore 34, and an inner surface 36 of the body 32 (which defines the central bore 34) and the steerer tube 14 may be connected via a friction fit. Accordingly, when the steerer tube 14 rotates, such as about the longitudinal axis 28, the coupling ring 30 rotates with the steerer tube 14.

Coupling ring 30 may further include an outer surface 38. As illustrated, outer surface 38 may include various portions which have different diameters. Notably, each portion may be a generally annular portion of the coupling ring 30. For example, outer surface 38 may include a first portion 42 having a first outer diameter (not labeled) and a second portion 44 having a second outer diameter (not labeled). The second outer diameter may be less than or greater than the first outer diameter. Further, outer surface 38 may include an intermediate portion 46 between the first and second portions 42, 44. The intermediate portion 46 (and outer diameter (not labeled) thereof) may taper between the first portion 42 and the second portion 44. Accordingly, the intermediate portion 46 can be considered an angled portion of the outer surface 38 relative to the remainder of the outer surface 38.

Headset 16 may further include a bearing assembly 50. An inner race 52 of the bearing assembly 50 may be rotatable with the coupling ring 30. For example, intermediate portion 46 may advantageously contact inner race 52, and this contact may facilitate rotation of the coupling ring 30 (such as about longitudinal axis 28) relative to other components of the headset 16. As illustrated, bearing assembly 50 includes inner race 52, an outer race 54, and a bearing member 56 disposed between the inner race 52 and outer race 54. Inner race 52 and outer race 54 are rotatable relative to each other, and are both in contact with bearing member 56. Bearing member 56 facilitates the movement of the inner race 52 and outer race 54 by reducing friction between the two components. In exemplary embodiments, bearing member 56 may include a plurality of ball bearings. Alternatively, however, any suitable bearing component is within the scope and spirit of the present disclosure.

As illustrated, inner race 52 may include an angled surface 53. The angled surface 53 may be positioned at an angle and orientation that corresponds to the angle and orientation of the intermediate portion 46, and intermediate portion 46 may contact the angled surface 53 of the inner race 52. This contact, and the frictional forces transmitted between the intermediate portion 46 and angled surface 53, may cause the inner race 52 to rotate with the coupling ring 30. Accordingly, inner race 52 and bearing assembly 50 generally may assist and reduce the overall friction associated with rotation of the coupling ring 30.

Bearing assembly 50 may, as illustrated, be disposed within a cup 60 of the headset 16. Coupling ring 30 may additionally be partially or fully disposed within cup 60. Cup 60 may in some embodiments be formed from a rigid material, such as a suitable rigid polymer, metal or other suitable material. Cup 60 includes a body 62 and a central bore 64 which is defined in and extends through the body 62. Cup 60 may be generally concentric with the coupling ring 30 and, when assembled in a head tube assembly 10, generally concentric with head tube 12 with respect to the longitudinal axis 28. Cup 60 may be connectable to and rotatable with the head tube 12. For example, cup 60 may be press-fit into the head tube 12, such that an outer surface 66 of the cup 60 and an inner surface 67 of the head tube 12 are in contact and connected via a friction fit. Accordingly, when the head tube 12 rotates, such as about the longitudinal axis 28, the cup 60 rotates with the head tube 12.

Headset 16 may further include, for example, a top cover 70, also known as a dust cover. Top cover 70 may in some embodiments be formed from a rigid material, such as a suitable rigid polymer, metal or other suitable material. Top cover 70 includes a body 72 and a central bore 74 which is defined in and extends through the body 72. Top cover 70 may be generally concentric with the coupling ring 30 and cup 60 and, when assembled in a head tube assembly 10, generally concentric with head tube 12 with respect to the longitudinal axis 28. Top cover 70 may be connectable to and rotatable with the steerer tube 14. For example, steerer tube 14 may extend through the central bore 74, and an inner surface 76 of the body 72 (which defines the central bore 74) and the steerer tube 14 may be connected via a friction fit. Accordingly, when the steerer tube 14 rotates, such as about the longitudinal axis 28, the top cover 70 rotates with the steerer tube 14.

As shown, body 72 may include a flange 78. The flange 78, or a portion thereof, may generally surround a portion of the cup 60 when the headset 16 is assembled. Additionally, as shown, top cover may include one or more gaskets 79, which may for example be o-rings as illustrated. The gaskets 79 may be disposed between the inner surface 76 and the steerer tube 14 when the headset 16 is assembled in a head tube assembly 10, thus generally sealing the interface between the top cover 70 and the steerer tub 14.

Headset 16 further includes a damper assembly 100. Damper assembly 100 generally includes damping components for increasing energy transmission through the various other components of the headset 16. This increase in energy transmission in turn advantageously increases the energy that is transmitted between the steerer tube 14 and head tube 12. Notably, the damper assembly 100 is generally disposed within and internal to the headset 16, such that a low profile component which both couples the steerer tube 14 and head tube 12 together and increases energy transmission between them is advantageously provided.

As illustrated, damper assembly 100 includes one or more first damper elements 102 and one or more second damper elements 104 that are in frictional communication and are rotatable relative to each other, such as about longitudinal axis 28. The frictional communication during such relative rotation facilitates the energy dissipation within the headset 16. In general, the first damper elements 102 are rotatable with the steerer tube 14, and the second damper elements 104 are rotatable with the head tube 12.

Referring now to FIGS. 1 through 4, in some embodiments, each first damper element 102 includes a disk 110 and a coupling element 112. In exemplary embodiments as shown, coupling element 112 is a tab. Disk 110 includes a body 114 and a central bore (not labeled) which is defined in and extends through the body 114. Body 114 has an outer surface 118 and an inner surface 119. Inner surface 119 defines the central bore. In exemplary embodiments, the first damper elements 102, such as the disks 110 thereof, are concentric with the coupling ring 30 and the cup 60. Coupling element 112 extends from the inner surface 119 into the central bore.

Further, each second damper element 104 includes a disk 120 and a coupling element 122. In exemplary embodiments as shown, coupling element 122 is a tab. Disk 120 includes a body 124 and a central bore (not labeled) which is defined in and extends through the body 124. Body 124 has an outer surface 128 and an inner surface 129. Inner surface 129 defines the central bore. In exemplary embodiments, the second damper elements 104, such as the disks 120 thereof, are concentric with the coupling ring 30 and the cup 60. Coupling element 122 extends from the outer surface 128 away from the central bore.

These damper elements 102, 104 may be connected to various other components of the headset 16 to facilitate rotation of the elements 102, 104 with the respective steerer tube 14 and head tube 12 and relative to each other. For example, as shown, the coupling element 112 of each first damper element 102 may extend from the inner surface 119 into a channel 130 defined in the body 32 of the coupling ring 30, and may contact the body 32 of the coupling ring 30. The channel 130 may thus capture coupling element 112, such that rotation of the coupling ring 30 causes rotation of the first damper element 102 with the coupling ring 30. Similarly, the coupling element 122 of each second damper element 104 may extend from the outer surface 128 into a channel 132 defined in the body 62 of the cup 60. This channel 132 may thus capture coupling element 122, such that rotation of the cup 60 causes rotation of the second damper element 104 with the cup 60.

In exemplary embodiments as shown, the first and second damper elements 102, 104 are concentric with each other. Further in embodiments wherein multiple first and/or second damper elements 102, 104 are utilized, the damper elements 102, 104 may be disposed in an alternative arrangement, such that each first damper element 102 neighbors a second damper element 104 and each second damper element 104 neighbors a first damper element 102. As mentioned, the damper elements 102, 104 may be in frictional communication. In exemplary embodiments, the frictional communication is a frictional contact between the elements 102, 104. Accordingly, in these embodiments, upper surface 142 and/or lower surface 144 of each disk 110 may frictionally contact an adjacent lower surface 148 and/or upper surface 146 of a neighboring disk 120, and upper surface 146 and/or lower surface 148 of each disk 120 may frictionally contact an adjacent upper surface 142 and/or lower surface 144 of each disk 110. These surfaces may directly contact each other, or a suitable fluid, which may for example be a viscous fluid such as grease or oil, may form a thin layer between the surfaces to facilitate rotation of the damper elements 102, 104 relative to each other while maintaining the frictional contact therebetween.

In alternative embodiments, the coupling elements 112, 122 of the damping elements 102, 104 need not engage the coupling ring 30 and cup 60 and rather may engage any other suitable component of the headset 16 that rotates with the steerer tube 14 or head tube 12, respectively. For example, in some embodiments, coupling elements 112 may extend into channels defined in the top cover 70 or the inner race 52. Coupling elements 122 may extend into channels defined in the outer race 54.

Figure 4:
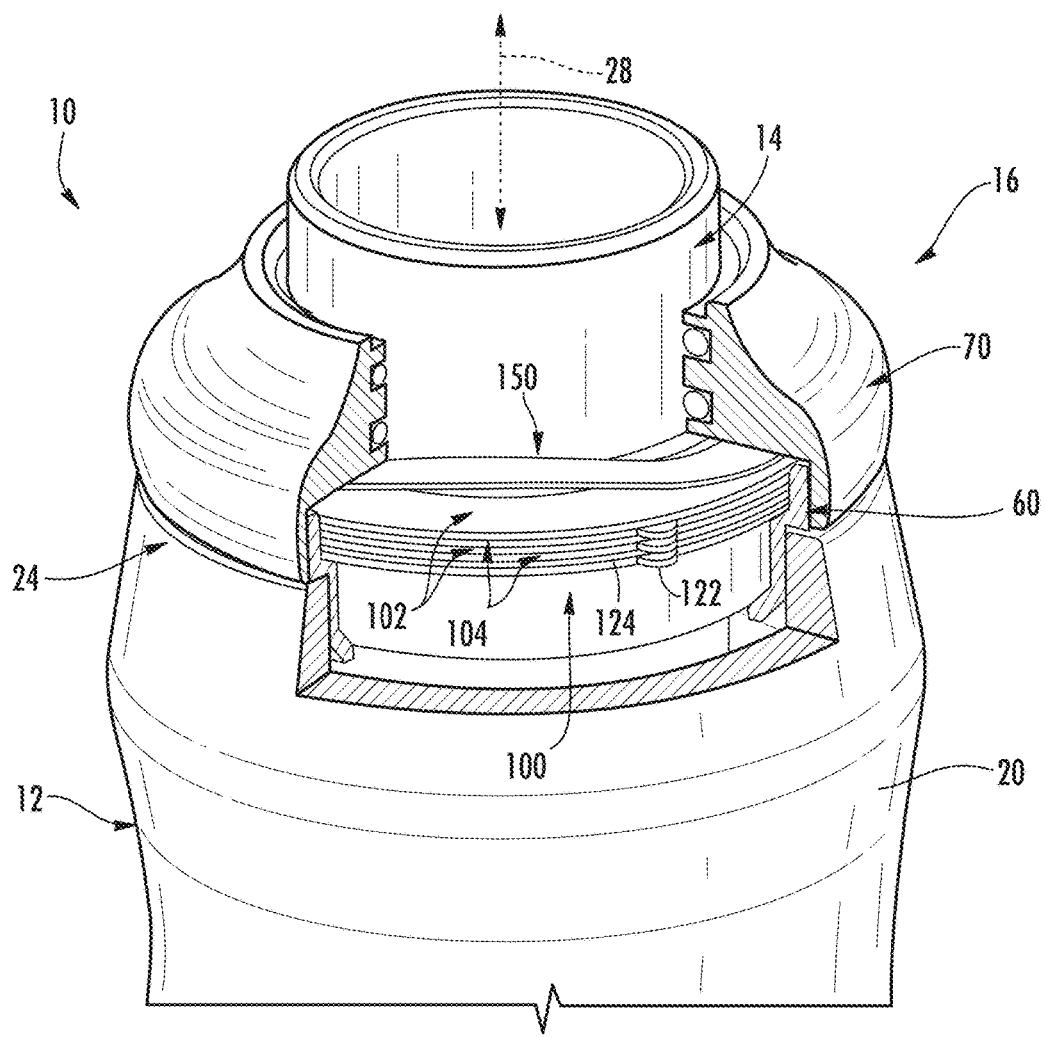
FIG. 4 is a close-up perspective view, with portions cut-away for illustrative purposes, of a portion of the head tube assembly, including an upper headset thereof, in accordance with another embodiment of the present disclosure.

In some embodiments, as illustrated in FIG. 4, damper assembly 100 may further include one or more biasing elements 150. Biasing element 150 may generally provide a biasing force to the first and second damper elements 102, 104, forcing the first and second damper elements 102, 104 towards each other and thus increasing the frictional contact between the first and second damper elements 102, 104. In exemplary embodiments, biasing element 150 may be a spring, such as a wave spring as shown.

Biasing element 150 may, for example, contact an upper surface 142, 146 or lower surface 144, 148 of the disks 110, 120. This contact and the biasing force imparted by the biasing element 150 on this disk 110, 120 may cause a biasing force to be provided to the damper elements 102, 104 by the biasing element 150, thus generally compressing the damper elements 102, 104 together. In exemplary embodiments as shown, a biasing element 150 may be disposed between the top cover 70, such as the body 72 thereof, and a damper element 102, 104. Additionally or alternatively, a biasing element 150 may be disposed between the cup 60, such as the body 62 thereof, and a damper element 102, 104, or between any other component of the headset 16 and a damper element 102, 104.

Figure 5:
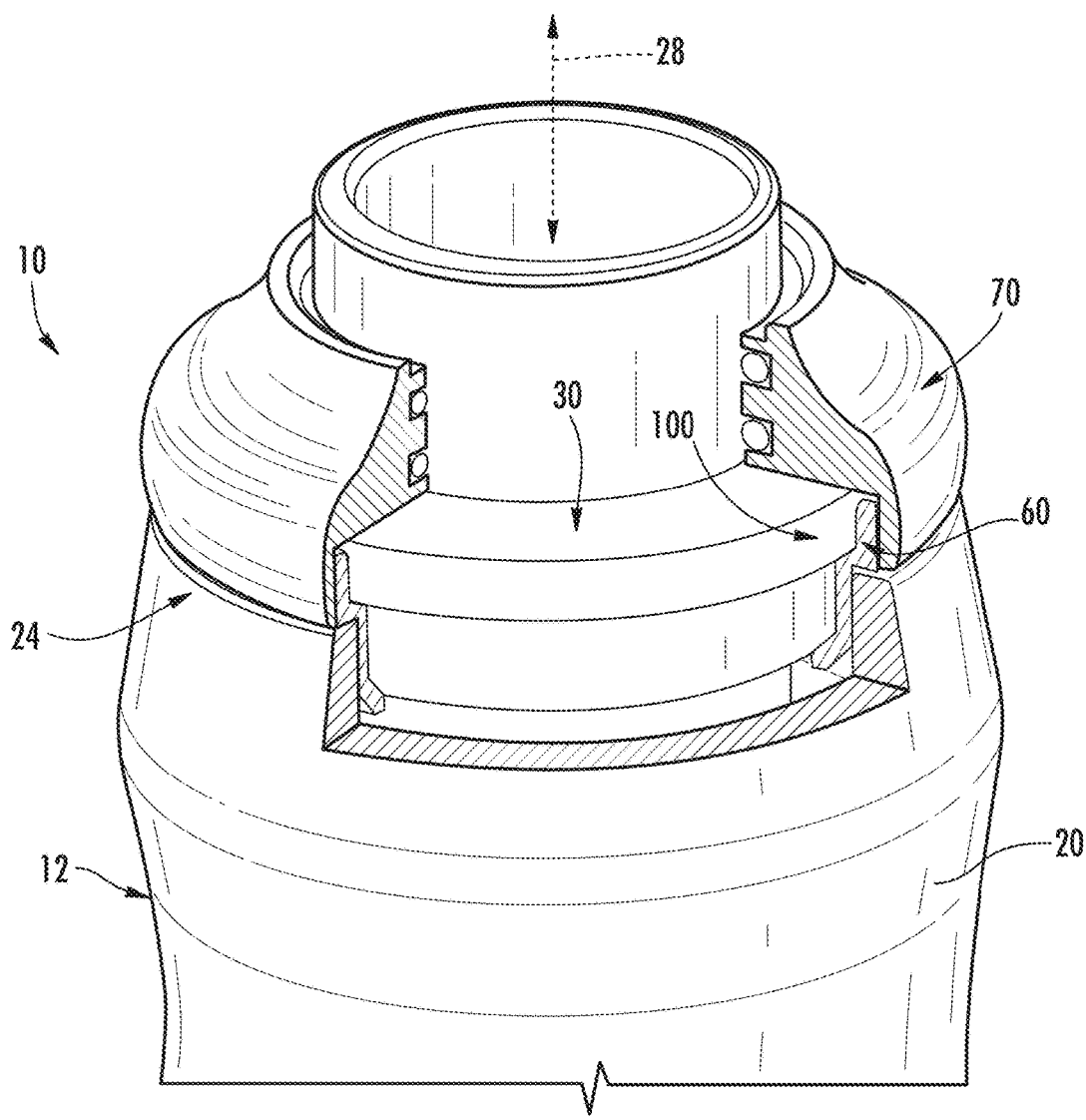
FIG. 5 is a close-up perspective view, with portions cut-away for illustrative purposes, of a portion of the head tube assembly, including an upper headset thereof, in accordance with another embodiment of the present disclosure.
Figure 6:
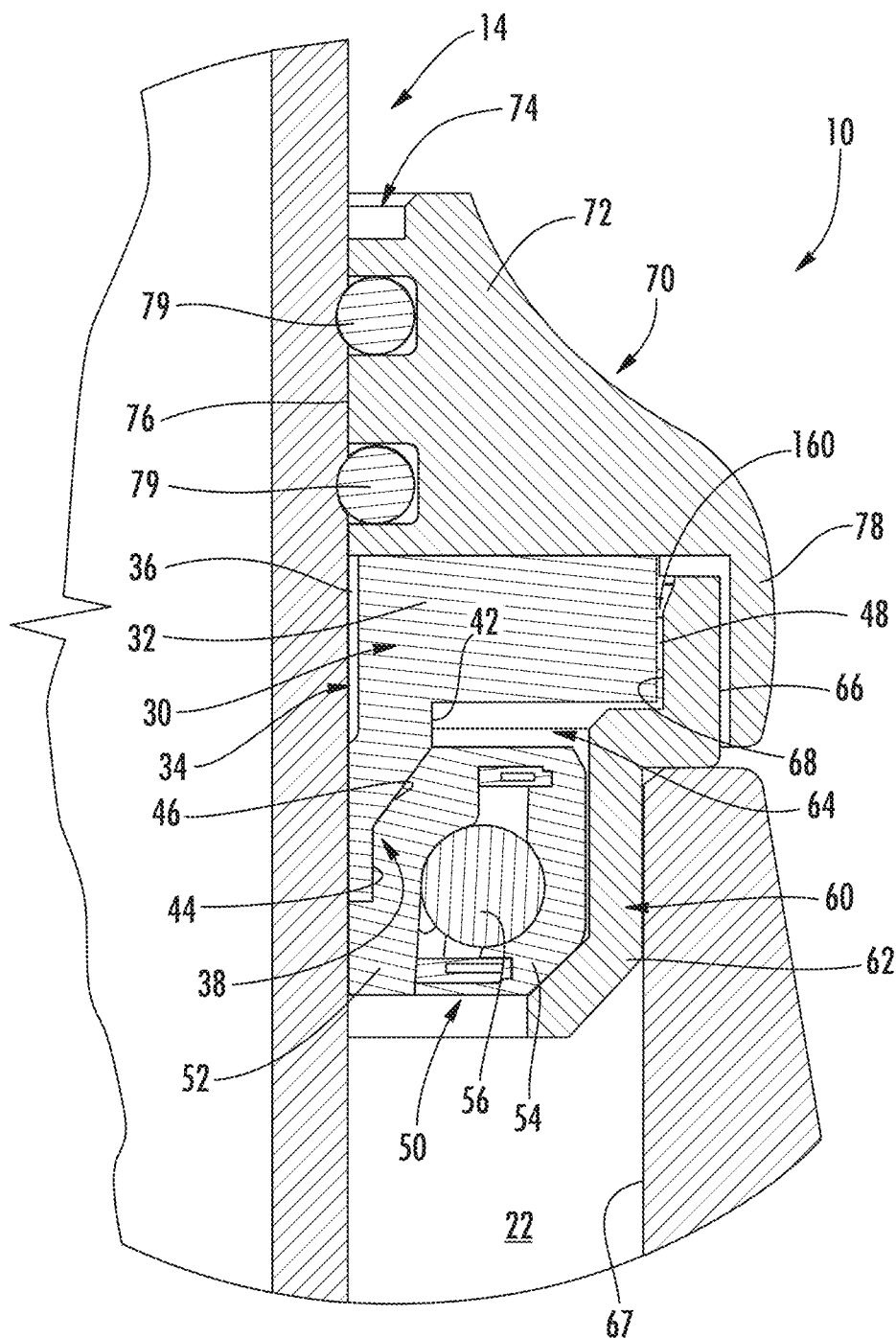
FIG. 6 is a side cross-sectional view of a portion of the head tube assembly, including an upper headset thereof, of FIG. 5.

Referring now to FIGS. 5 through 12, in other embodiments, various components of the headset 16 may additionally serve as the first damper element 102 and/or second damper element 104. Some of these components may be modified for this purpose. For example, as illustrated in FIGS. 5 and 6, the first damper element 102 may be the coupling ring 30. Specifically, the coupling ring 30 may be modified to include a portion that acts as the first damper element 102. For example, as discussed above, outer surface 38 of coupling ring 30 includes a first portion 42 that has a first outer diameter. Outer surface 38 may additionally include a second portion 44 and an intermediate portion 46 as discussed herein. Further, outer surface 38 may include a flange portion 48, which may have a flange diameter (not labeled). The flange diameter (not labeled) may be greater than the first outer diameter, as shown. The flange portion 48 of the outer surface 38 may serve as the first damper element 102, and may thus be in frictional contact with and rotatable relative to a second damper element 104.

Second damper element 104 may, for example and as shown, be the cup 60. Specifically, a surface of cup 60 may act as second damper element 104. For example, body 62 of cup 60 may have an inner surface 68 that defines the central bore 64 therethrough. Inner surface 68 may act as the second damper element 104, and may thus be in frictional contact with and rotatable relative to a first damper element 104.

FIGS. 5 and 6 illustrate such frictional contact between the flange portion 48 of the coupling ring 30 and the inner surface 68 of the cup 60. In the embodiment shown, a fluid 160 is disposed between the coupling ring 30, such as the flange portion 48 thereof, and the cup 60, such as the inner surface 68 thereof. Notably, these surfaces may directly contact each other, or a suitable fluid 160, which may for example be a viscous fluid such as grease or oil, may form a thin layer between the surfaces to facilitate rotation of the damper elements 102, 104 relative to each other while maintaining the frictional contact therebetween.

Figure 7:
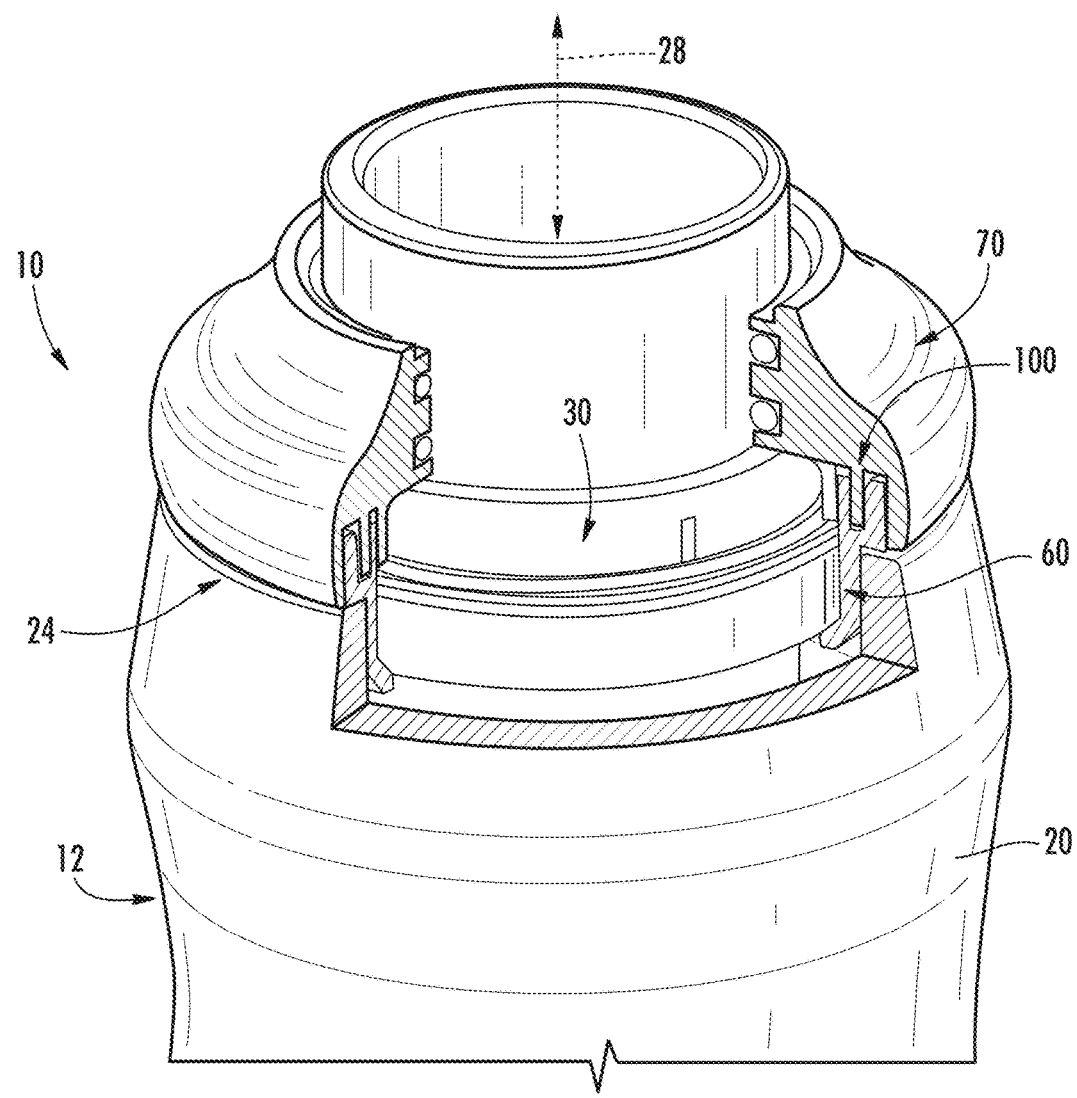
FIG. 7 is a close-up perspective view, with portions cut-away for illustrative purposes, of a portion of the head tube assembly, including an upper headset thereof, in accordance with another embodiment of the present disclosure.
Figure 8:
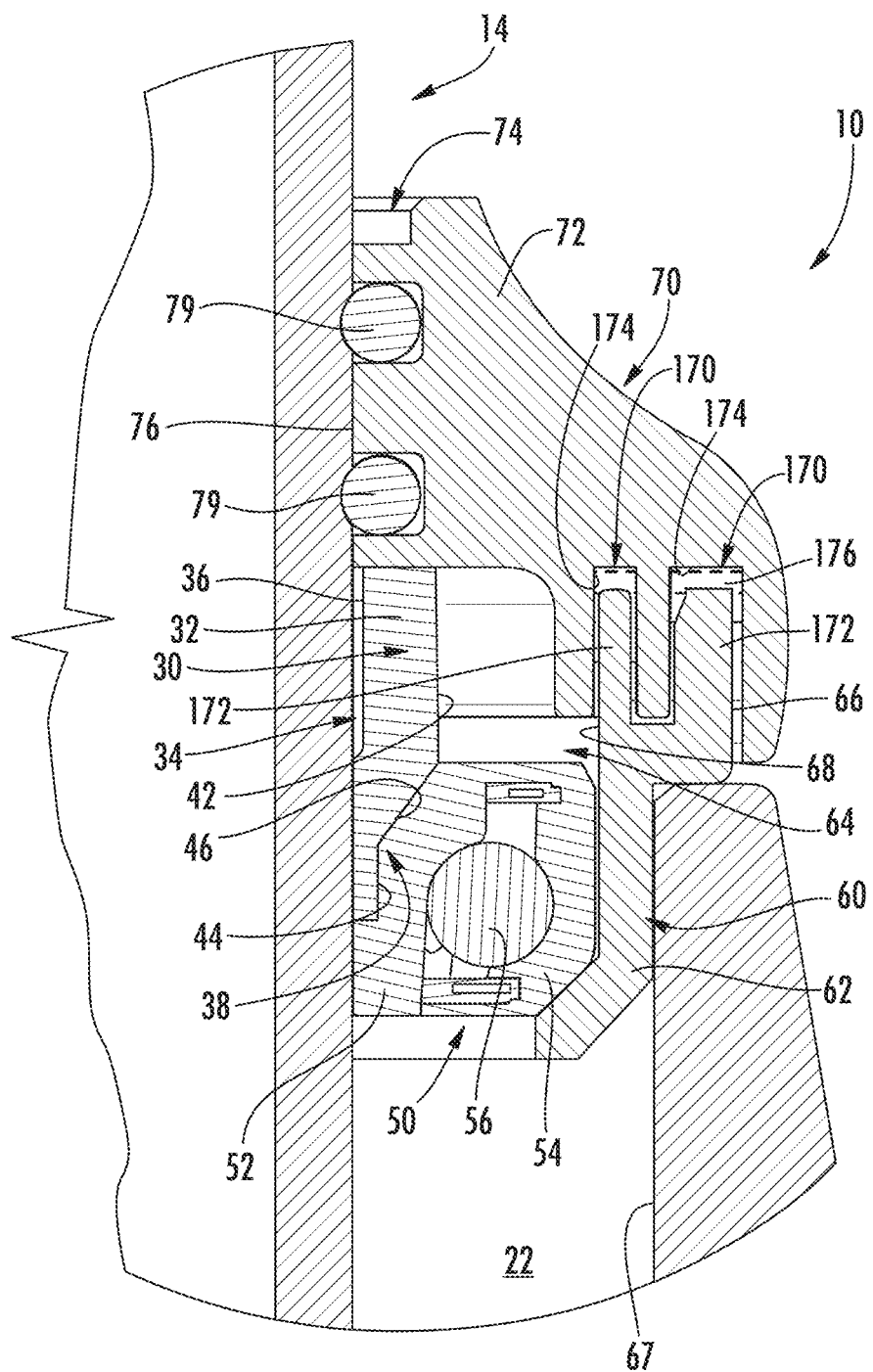
FIG. 8 is a side cross-sectional view of a portion of the head tube assembly, including an upper headset thereof, of FIG. 7.
Figure 9:
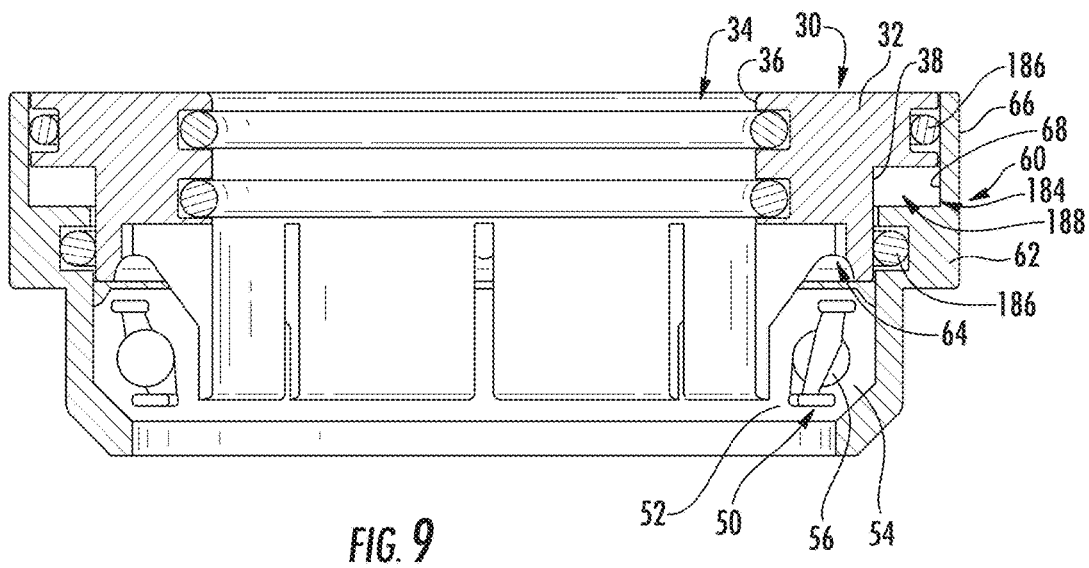
FIG. 9 is a side cross-sectional view of a cup and coupling ring of a headset in accordance with another embodiment of the present disclosure.
Figure 10:
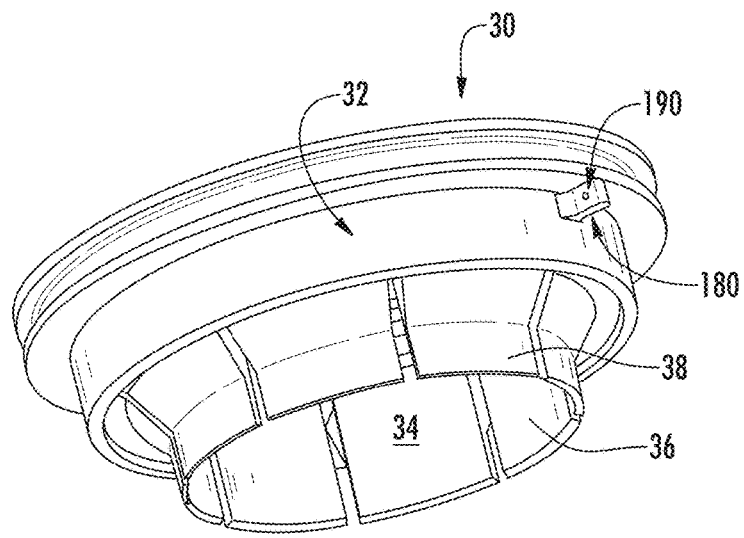
FIG. 10 is a perspective view of the coupling ring of the headset of FIG. 9.
Figure 11:
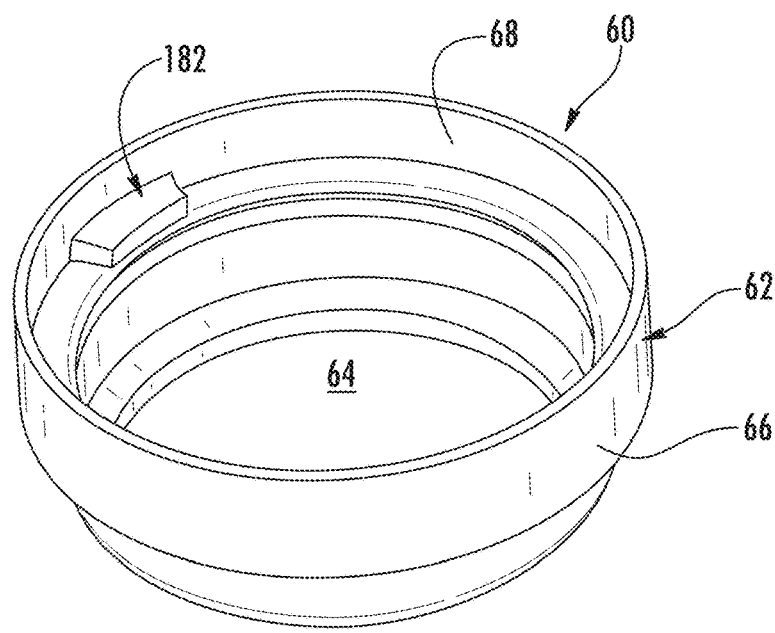
FIG. 11 is a perspective view of the cup of the headset of FIG. 9.
Figure 12:
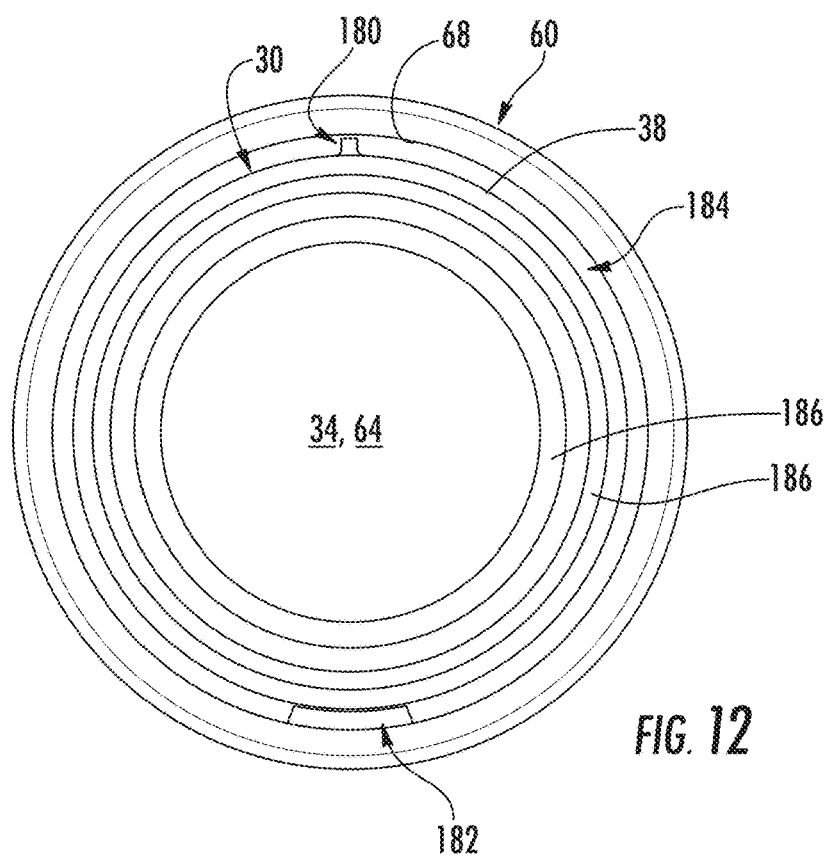
FIG. 12 is a top cross-sectional view of the headset of FIG. 9.

Referring now to FIGS. 7 and 8, in some embodiments, the first damper element 102 is the top cover 70 and the second damper element 104 is the cup 60. Specifically, the top cover 70 may be modified to include a portion that acts as the first damper element 102. The cup 60 may be modified to include a portion that acts as the second damper element 104. For example, as shown, the body 72 of the top cover 70, such as the flange 78 thereof, may define one or more channels 170 therein. The cup 60 may include one or more projections 172 extending from the body 62 thereof. Each projection 172 may extend into an associated channel 170, and be in frictional contact with and rotatable relative to inner surfaces 174 which define the channel 170.

In the embodiment shown, a fluid 176 is disposed between the top cover 70, such as the inner surfaces 174 defining the channels 170 thereof, and the cup 60, such as the projections 172 thereof. Notably, these surfaces may directly contact each other, or a suitable fluid 160, which may for example be a viscous fluid such as grease or oil, may form a thin layer between the surfaces to facilitate rotation of the damper elements 102, 104 relative to each other while maintaining the frictional contact therebetween.

FIGS. 9 through 12 illustrate another embodiment wherein the first damper element 102 is the coupling ring 30 and the second damper element 104 is the cup 60. Specifically, in these embodiments, coupling ring 30 includes a first protrusion 180 that extends from the outer surface 38 of the body 32 of the coupling ring 30. Cup 60 includes a second protrusion 182 that extends from the inner surface 68 of the body 62 of the cup 60. Notably, the protrusions 180, 182 may be integral with the respective coupling ring 30 and cup 60, or may be separate components connected to the coupling ring 30 and cup 60. Further, as shown, in these embodiments a channel 184 may be defined between the body 32 of the coupling ring 30 and the body 62 of the cup 60. Channel 184 may be a generally circumferential or peripheral channel, extending between the entire circumference or periphery of the coupling ring 30 and cup 60. Further, sealing members 186, such as o-rings, may generally seal the channel 184 and prevent leakage therefrom. The first and second protrusions 180, 182 may be disposed within the channel 184.

A fluid 188, such as a viscous fluid such as grease or oil, may additionally be disposed within the channel 184. In general, the protrusions 180, 182 may restrict the flow path defined within the channel 184 for the fluid to move therethrough. The protrusions 180, 182 may be in frictional communication through the fluid 188. For example, when the coupling ring 30 or the cup 60 rotates, the corresponding one of the protrusions 180, 182 rotates relative to the other. This rotation causes the rotating protrusion 180, 182 to force the fluid 188 in a direction towards the other protrusion 180, 182. The fluid 188 may then encounter the protrusion 180, 182 and be forced to flow through the restriction in the flow path defined within the channel 184 caused by the protrusion 180, 182. In some embodiments, one or both protrusions 180, 182 may additionally include a bore hole 190 defined therein which allows fluid 188 flow therethrough. The size of the bore hole 190, and the size of the protrusions 180, 182 and resulting restrictions in the flow path defined within the channel 184 may be sized to provide a desired damping effect.

Notably, other suitable modifications or uses of the coupling ring 40, top cover 70 and/or cup 60, and specifically various surfaces thereof, to form the first and second damper elements 102, 104 are within the scope and spirit of the present disclosure. For example, any suitable surface of the coupling ring 30 and/or top cover 70 may be placed in frictional communication with cup 60 in accordance with the present disclosure, such that these surfaces serve as the first and second damper elements 102, 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A headset for a vehicle, the vehicle comprising a steerer tube and a head tube, the headset rotatably connecting the steerer tube and the head tube, the headset comprising:
   a coupling ring comprising a body and a central bore defined in and extending through the body, the coupling ring connectable to and rotatable with the steerer tube;
   a cup comprising a body and a central bore defined in and extending through the body, the cup connectable to and rotatable with the head tube;
   a bearing assembly disposed within the cup, the bearing assembly comprising an inner race, an outer race, and a bearing member disposed between the inner race and the outer race; and
   a damper assembly, the damper assembly comprising a first damper element rotatable with the steerer tube and a second damper element rotatable with the head tube, the first damper element and the second damper element in frictional communication with and rotatable relative to each other,
   wherein the first damper element comprises a disk and a coupling element, the disk comprising a body and a central bore defined in and extending through the body, the body having an outer surface and an inner surface, the coupling element extending from the inner surface, and wherein the second damper element comprises a disk and a coupling element, the disk comprising a body and a central bore defined in and extending through the body, the body having an outer surface and an inner surface, the coupling element extending from the outer surface, wherein the coupling element of the first damper element extends from the inner surface of the first damper element into a channel defined in the body of the coupling ring, and wherein the coupling element of the second damper element extends from the outer surface of the second damper element into a channel defined in the body of the cup.

2. The headset of claim 1, wherein the frictional communication is frictional contact.

3. The headset of claim 1, wherein the first damper element and the second damper element are concentric.

4. The headset of claim 1, wherein the damper assembly comprises a plurality of first damper elements and a plurality of second damper elements.

5. The headset of claim 1, wherein the damper assembly further comprises a biasing member, the biasing member providing a biasing force to the first damper element and the second damper element.

6. The headset of claim 5, wherein the biasing member is a spring.

7. The headset of claim 5, further comprising a top cover comprising a body and a central bore defined in and extending through the body, the top cover connectable to and rotatable with the steerer tube, and wherein the biasing element is disposed between the top cover and one of the first damper element or the second damper element.

8. The headset of claim 1, further comprising a top cover comprising a body and a central bore defined in and extending through the body, the top cover connectable to and rotatable with the steerer tube.

9. The headset of claim 8, wherein the damper assembly further comprises a fluid disposed between the top cover and the cup.

10. The headset of claim 1, wherein the body of the coupling ring comprises an outer surface which includes a first portion having a first outer diameter, a second portion having a second outer diameter smaller than the first outer diameter, and an intermediate portion that tapers between the first portion and the second portion.

11. The headset of claim 10, wherein the intermediate portion contacts an angled surface of the inner race.

12. The headset of claim 1, wherein the inner race is rotatable with the coupling ring.

13. A headset for a vehicle, the vehicle comprising a steerer tube and a head tube, the headset rotatably connecting the steerer tube and the head tube, the headset comprising:
   a coupling ring comprising a body and a central bore defined in and extending through the body, the coupling ring connectable to and rotatable with the steerer tube;
   a cup comprising a body and a central bore defined in and extending through the body, the cup connectable to and rotatable with the head tube;
   a bearing assembly disposed within the cup, the bearing assembly comprising an inner race, an outer race, and a bearing member disposed between the inner race and the outer race; and
   a damper assembly, the damper assembly comprising a first damper element rotatable with the steerer tube and a second damper element rotatable with the head tube, the first damper element and the second damper element in frictional communication with and rotatable relative to each other, wherein the first damper element is the coupling ring and the second damper element is the cup.

14. The headset of claim 13, wherein the frictional communication is frictional contact.

15. The headset of claim 13, wherein the body of the coupling ring comprises an outer surface which includes a first portion having a first outer diameter and a flange portion having a flange diameter that is greater than the first outer diameter, and wherein the flange portion is in frictional contact with and is rotatable relative to an inner surface of the cup.

16. The headset of claim 13, wherein the damper assembly further comprises a fluid disposed between the coupling ring and the cup.

17. The headset of claim 13, wherein the coupling ring comprises a first protrusion extending from an outer surface of the body of the coupling ring and the cup comprises a second protrusion extending from an inner surface of the body of the cup, the first protrusion and the second protrusion disposed within a channel defined between the body of the coupling ring and the body of the cup, and wherein a fluid is disposed within the channel and the first protrusion and second protrusion are in frictional communication through the fluid.

18. The headset of claim 13, further comprising a top cover comprising a body and a central bore defined in and extending through the body, the top cover connectable to and rotatable with the steerer tube.

19. The headset of claim 18, wherein the damper assembly further comprises a fluid disposed between the top cover and the cup.

20. The headset of claim 13, wherein the body of the coupling ring comprises an outer surface which includes a first portion having a first outer diameter, a second portion having a second outer diameter smaller than the first outer diameter, and an intermediate portion that tapers between the first portion and the second portion.

21. The headset of claim 20, wherein the intermediate portion contacts an angled surface of the inner race.

22. The headset of claim 13, wherein the inner race is rotatable with the coupling ring.

23. A headset for a vehicle, the vehicle comprising a steerer tube and a head tube, the headset rotatably connecting the steerer tube and the head tube, the headset comprising:
- a coupling ring comprising a body and a central bore defined in and extending through the body, the coupling ring connectable to and rotatable with the steerer tube;
- a cup comprising a body and a central bore defined in and extending through the body, the cup connectable to and rotatable with the head tube;
- a bearing assembly disposed within the cup, the bearing assembly comprising an inner race, an outer race, and a bearing member disposed between the inner race and the outer race;
- a damper assembly, the damper assembly comprising a first damper element rotatable with the steerer tube and a second damper element rotatable with the head tube, the first damper element and the second damper element in frictional communication with and rotatable relative to each other; and
- a top cover comprising a body and a central bore defined in and extending through the body, the top cover connectable to and rotatable with the steerer tube, wherein the first damper element is the top cover and the second damper element is the cup.

24. The headset of claim 23, wherein the body of the top cover defines a channel and the cup comprises a projection extending from the body of the cup, the projection extending into the channel and in frictional contact with an inner surface of the channel.

25. The headset of claim 23, wherein the damper assembly further comprises a fluid disposed between the top cover and the cup.

26. The headset of claim 23, wherein the body of the coupling ring comprises an outer surface which includes a first portion having a first outer diameter, a second portion having a second outer diameter smaller than the first outer diameter, and an intermediate portion that tapers between the first portion and the second portion.

27. The headset of claim 26, wherein the intermediate portion contacts an angled surface of the inner race.

28. The headset of claim 23, wherein the inner race is rotatable with the coupling ring.

\* \* \* \* \*